W. F. FOLMER.
WIND MOTOR.
APPLICATION FILED NOV. 28, 1917.

1,270,803.

Patented July 2, 1918.
2 SHEETS—SHEET 1.

INVENTOR.
William F. Folmer
BY
his ATTORNEYS.

WITNESSES:

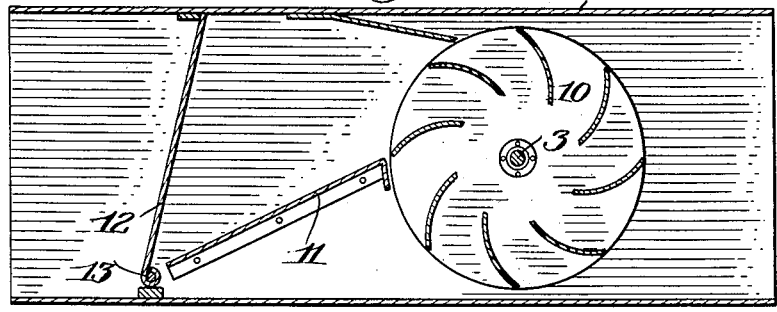
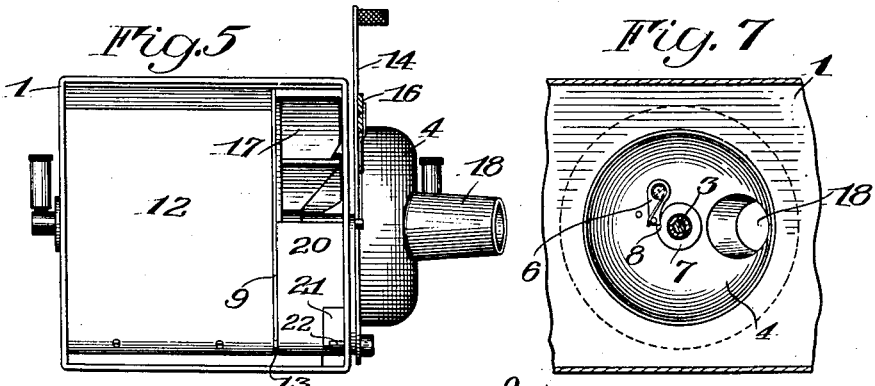
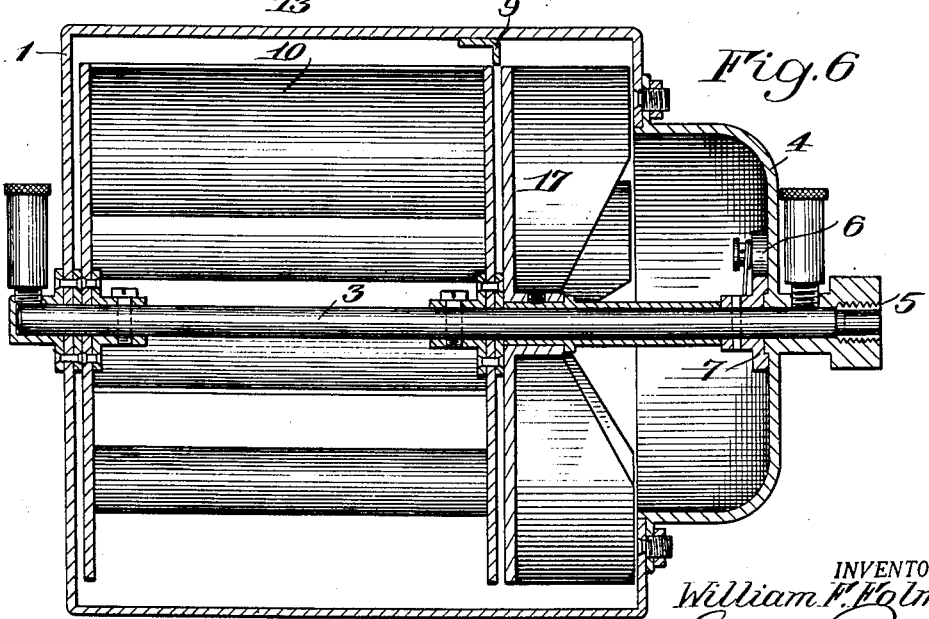

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

WIND-MOTOR.

1,270,803.  Specification of Letters Patent.  Patented July 2, 1918.

Application filed November 28, 1917. Serial No. 204,302.

*To all whom it may concern:*

Be it known that I, WILLIAM F. FOLMER, of Rochester, in the county of Monroe and State of New York, have invented certain new and useful Improvements in Wind-Motors; and I do hereby declare the following to be a full, clear, and exact description of the same, reference being had to the accompanying drawings, forming a part of this specification, and to the reference-numerals marked thereon.

My present invention relates to motors and more particularly to wind motors of a type adapted to furnish a limited amount of power for special purposes in an aeroplane and to derive it from the motion of the plane through the air. In a co-pending application I disclose an aerial camera of an automatic nature which requires a source of power for driving the film and a source of power for holding the film flat by air pressure acting against the vacuum. This invention has for its object to provide a motor equipped for this particular purpose in which greater power is developed for the one function than for the other and both are under the control of a common operating member. To these and other ends the invention resides in certain improvements and combinations of parts, all as will be hereinafter more fully described, the novel features being pointed out in the claims at the end of the specification.

In the drawings:

Fig. 4 is a vertical section taken substantially on the line 4—4 of Fig. 2;

Fig. 5 is an end view;

Fig. 6 is a transverse section taken substantially on the line 6—6 of Fig. 2, and Fig. 7 is a detail fragmentary view showing a portion of the inner wall of the casing in the region of the shaft bearing.

Similar reference numerals throughout the several views indicate the same parts.

Figure 1:
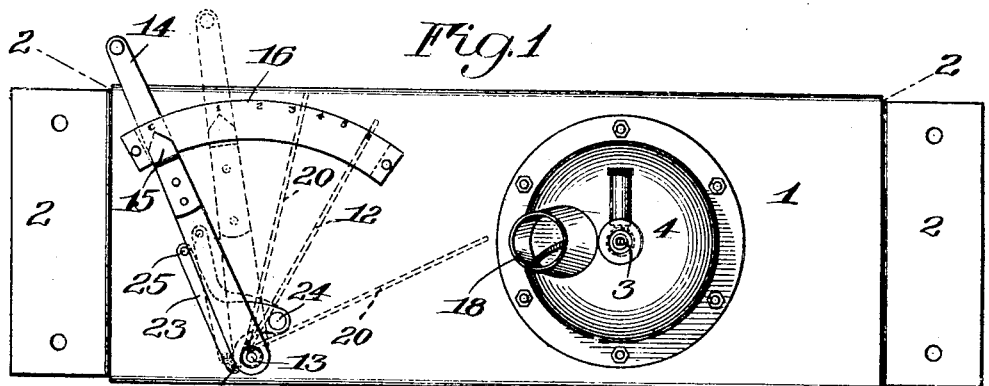
Figure 1 is a side elevation of a wind motor constructed in accordance with and illustrating one embodiment of my invention.
Figure 2:
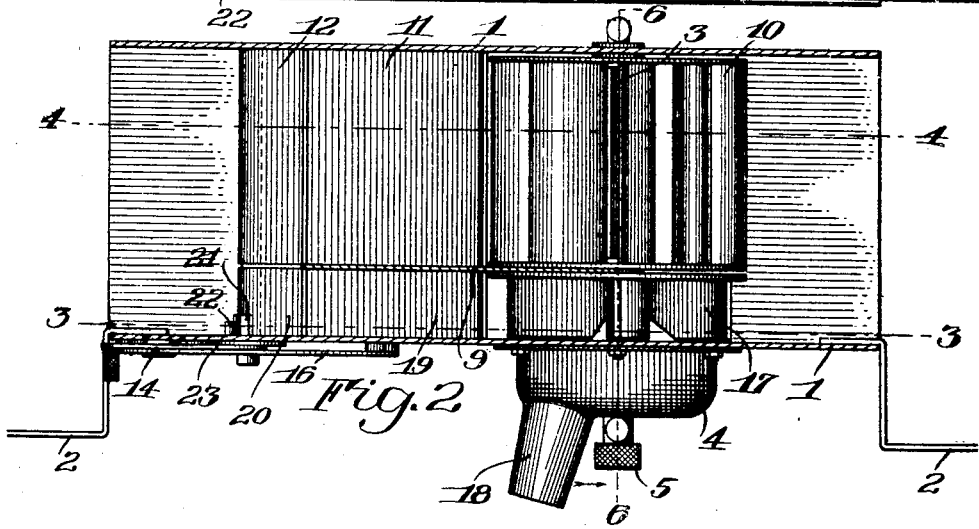
Fig. 2 is a horizontal section thereof taken just below the plane of the top wall of the casing on the line 2—2 of Fig. 1.

In the photographic apparatus referred to, it is desired to run the film according to the speed of the aeroplane, whereas the vacuum produced behind the film must not be increased in the same proportion as it would lead to too great friction. I therefore provide independent drivers arranged in the same general element in the following manner:

Referring to the drawings, 1 indicates an oblong box or casing open at both ends and provided with brackets 2 for attachment to the side of the aeroplane. Extending transversely through the casing is a shaft 3 that also extends through an exhausting chamber 4 secured to the side of the casing 1. Beyond the chamber 4 the shaft terminates in a coupling member 5 whereby it is joined up by a flexible shaft (not shown) to the film winding devices. On the inner face of the chamber casting 4 (Fig. 7) is a spring actuated pawl 6 that rides upon a collar 7 fixed to the shaft and having a notch 8 therein with which the pawl locks in case the shaft starts to turn in the wrong direction.

The casing 1 is partially divided longitudinally by a partition 9 and on one side of the partition is a wind wheel 10 fixed to the shaft 3 to drive the latter. It is arranged in rear of an inclined deflector 11 (Fig. 4) and a gate 12 pivoted on a fixed shaft 13 to occupy the closed position of Fig. 4 or an extreme open position in which it lies against the plate 11 and permits the full volume of air to strike and turn the wheel 10. The speed of the latter and of the shaft 3 is therefore regulated by the admission of air through this gate and the gate is adjusted to different positions by an operating lever 14 secured to the shaft 13 and having an indicator 15 coöperating with a graduated segment 16. By setting this lever at different points, according to the speed of the aeroplane, the desired speed of the shaft 3 is effected.

On the other side of the partition 9 is another wind wheel 17 which is also an exhauster being centrally in communication with the exhausting chamber 4 and loosely mounted on the shaft 3. Leading from the latter is a pipe connection 18 from which air is drawn from the camera back to hold the film flat. This wheel 17 is in rear of a deflector 19 and the access of air currents thereto is regulated by a gate 20 that has the same range of movement as the gate 12.

The gate 20, however, is loosely mounted on the shaft 13 and has no intermediate position but merely an extreme open position against the plate 19 that is assumed each time the operating lever 14 is moved to open the gate 12 to any degree.

Figure 3:
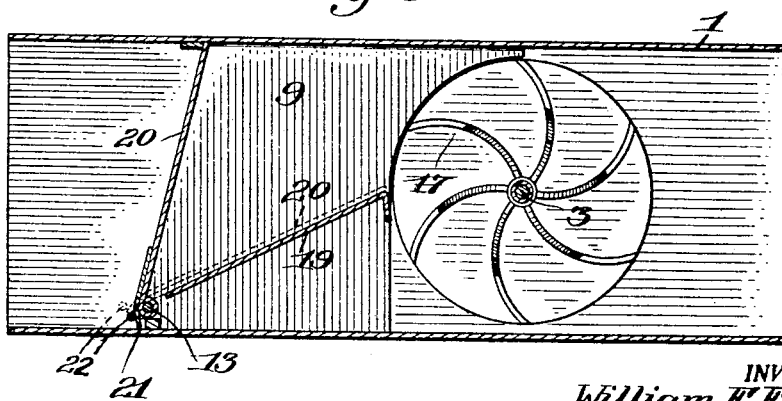
Fig. 3 is a vertical section taken substantially on the line 3—3 of Fig. 2.

To effect this, the gate 20 has a short arm 21 on the opposite side of the axis and coöperating with this arm is a pin 22 on a lever 23 pivoted at 24 to one side of the shaft 13 to produce greater throw. The operating lever 14 engages the lever 23 through the medium of a pin 25 and when the parts are in their normal positions with the lever 14 at zero both gates 12 and 20 are closed. The position of the lever 23 at this time is shown in full lines in Fig. 1. As soon as the operating lever 14 is moved to open the gate 12 to any appreciable extent, it moves away from the pin 25 and releases the lever 23 sufficiently for the pin 22 to be retracted a distance indicated by dotted lines in Fig. 3, allowing the full swing of the short arm 21 and thereby permitting the gate 20 to move to the full open position against the plate 19 as shown in dotted lines in Fig. 3. As soon as the operating lever 14 is moved back to zero and into engagement with the pin 25, the pin 22 thrusts against the short arm 21 and closes the gate 20.

In this way, it will be seen that when the driving wheel 10 is turning at all and in proportion to the speed of the aeroplane, the exhauster 17 is working at full capacity and it continues to so operate through different speeds of the wheel 10 until the latter is shut off entirely. Thus, just sufficient vacuum is maintained to hold the film flat whatever its speed and this vacuum is kept up until the motor as a whole is shut off whereupon it too is shut off.

I claim as my invention:

1. In a wind motor, the combination with a casing including an exhausting chamber, of a shaft extending therethrough, a wind wheel fixed to the shaft, a wind driven exhauster mounted to turn freely on the shaft in connection with the exhaust chamber and a partition for separating air currents directed against the wind wheel and exhauster, respectively.

2. In a wind motor, the combination with a shaft and a wind wheel fixed to the shaft, of a wind driven exhauster mounted to turn freely on the shaft, an exhaust pipe connection to the exhauster and means for directing air currents differentially against the wind wheel and the exhauster, respectively.

3. In a wind motor, the combination with two wind wheels adapted to turn independently of each other, of two gates for regulating the air currents admitted to each, respectively, and a common operating device for the gates connected to adjust one to selective position and to open the other entirely whenever operated.

4. In a wind motor, the combination with two wind wheels adapted to turn independently of each other, of two pivoted gates for regulating the air currents admitted to each, respectively, an operating lever directly connected to turn one gate slowly to different positions of adjustment and to turn the other gate quickly to an extreme position.

5. In a wind motor, the combination with two wind wheels adapted to turn independently of each other, of two pivoted gates for regulating the air currents admitted to each, respectively, one of said gates being provided with a short arm on the opposite side of the pivot, an operating lever directly connected to turn one gate to different positions of adjustment, and a lever coöperating with the short arm of one of the gates and normally held by the operating lever to maintain said gate closed.

WILLIAM F. FOLMER.

Witnesses:
MARGARET H. MILLIGAN,
GEORGE T. ROCHE.